United States Patent
Coates, Jr. et al.

(10) Patent No.: US 6,422,027 B1
(45) Date of Patent: Jul. 23, 2002

(54) SYSTEM AND METHOD FOR COOLING A BATTERY PACK

(75) Inventors: Calvin Edward Coates, Jr., Canton; Ronald David Brost, Dearborn, both of MI (US)

(73) Assignee: Ford Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/848,031

(22) Filed: May 3, 2001

(51) Int. Cl.[7] .............................................. F25D 23/12
(52) U.S. Cl. ......................... 62/259.2; 62/185; 62/244
(58) Field of Search ................................ 62/259.2, 185, 62/201, 207, 244; 307/9.1; 429/120, 62

(56) References Cited

U.S. PATENT DOCUMENTS

| | | | | |
|---|---|---|---|---|
| 5,641,589 A | * | 6/1997 | Grivel et al. | 429/120 |
| 5,879,833 A | * | 3/1999 | Yoshii et al. | 429/62 |
| 5,985,483 A | * | 11/1999 | Verhoog et al. | 429/120 |
| 6,296,968 B1 | * | 10/2001 | Verhoog | 429/120 |

FOREIGN PATENT DOCUMENTS

JP          05344606 A   *  12/1993

* cited by examiner

*Primary Examiner*—Chen-Wen Jiang
(74) *Attorney, Agent, or Firm*—Ford Global Tech., Inc.

(57) ABSTRACT

A battery cooling system 10 for use with a vehicle 14 including several batteries or battery modules 16–38 which provide power to the vehicle 12. The system 10 includes a refrigerant gas channeling or conduit system which is effective to store, compress, expand and circulate refrigerant gas through the battery pack 12 and the system 10. A first "high pressure" conduit system, having several tubes or conduits that are disposed throughout the vehicle 14, is used to selectively carry and transport pressurized or compressed refrigerant gas to the battery pack 12 and includes a pump 42, a heat exchanger 44, expansion valves 46–52, and conduits 54, 56, 58, 60 and 62. A second "low pressure" conduit system is used to circulate the "expanded" or decompressed refrigerant gas throughout the battery pack 12 and to return the refrigerant gas to pump 42 for recompression. The low pressure conduit system includes conduits 64–78 which are in contact with one or more sides of the various battery modules 16–38 and which absorb and/or dissipate heat from battery modules 16–38, and conduits 80–84 which return the circulated refrigerant gas to pump 42.

18 Claims, 1 Drawing Sheet

SYSTEM AND METHOD FOR COOLING A BATTERY PACK

FIELD OF THE INVENTION

This invention relates to a system and method for cooling a battery pack and more particularly, to a system and method for cooling a battery pack within an electric or a hybrid electric vehicle and which includes a plurality of cooling passages which are internal to the battery pack and which provide for a substantially even rate of cooling throughout the battery pack, thereby reducing thermal gradients within the battery pack.

BACKGROUND OF THE INVENTION

In order to reduce automotive emissions and the demand for fossil fuel, automotive vehicles have been designed which are powered by electrical devices such as batteries. These electric vehicles reduce emissions and the demand for conventional fossil fuels by eliminating the internal combustion engine (e.g., in completely electric vehicles) or by operating the engine at only its most efficient/preferred operating points (e.g., within hybrid electric vehicles).

In order to ensure optimal operation of these battery powered vehicles, it is necessary to provide cooling to the batteries in order to keep them at or below a certain temperature. The batteries in these vehicles are typically arranged within a pack containing several batteries or battery modules. Particularly, the battery pack will typically include several batteries disposed in rows and columns.

Prior cooling systems utilize a fan or blower to cool a battery pack. Particularly, the fan or blower directs pre-cooled air onto the battery pack, thereby cooling the individual battery modules. This type of cooling system, however, does not efficiently nor evenly cool the batteries, due to the fact that each of the individual batteries are disposed at different distances from the fan. As a result, this type of prior system often give rises to thermal gradients across the battery packs which adversely effect the performance of the batteries. Other types of prior systems which use liquid cooling arrangements are relatively expensive and undesirably and significantly raise the cost of the vehicle.

There is therefore a need for a new and improved battery cooling system and method which substantially provides for relatively rapid and even cooling throughout a battery pack.

SUMMARY OF THE INVENTION

A first non-limiting advantage of the present invention is that it provides a battery cooling system and method that efficiently and evenly cools several battery modules arranged in a pack.

A second non-limiting advantage of the present invention is that it utilizes a cooling mechanism or reaction which is internal to a battery pack, thereby providing for relatively rapid and even cooling throughout the battery pack.

According to a first aspect of the present invention, a system is provided for cooling a battery pack of the type used within a vehicle. The system includes a source of refrigerant gas; a pump for compressing the refrigerant gas; a high pressure conduit system which is fluidly coupled to the pump and which delivers the compressed refrigerant gas to the battery pack; at least one expansion valve which is fluidly coupled to the high pressure conduit system, and which is effective to decompress the refrigerant gas; and a low pressure conduit system which is fluidly coupled to the at least one expansion valve, which receives the decompressed refrigerant gas, and which circulates the refrigerant gas throughout the battery pack, thereby relatively rapidly and cooling the battery pack.

According to a second aspect of the present invention, a method is provided for cooling a battery pack of the type including a plurality of battery modules. The method includes the steps of compressing refrigerant gas; delivering the compressed refrigerant gas to the battery pack; decompressing the refrigerant gas; and channeling the decompressed refrigerant gas throughout the battery pack, thereby relatively rapidly and evenly cooling the plurality of battery modules.

These and other features, aspects, and advantages of the invention will become apparent by reading the following specification and by reference to the following drawings.

DETAILED DESCRIPTION OF THE PREFERRED EMBODIMENT OF THE INVENTION

Figure 1:
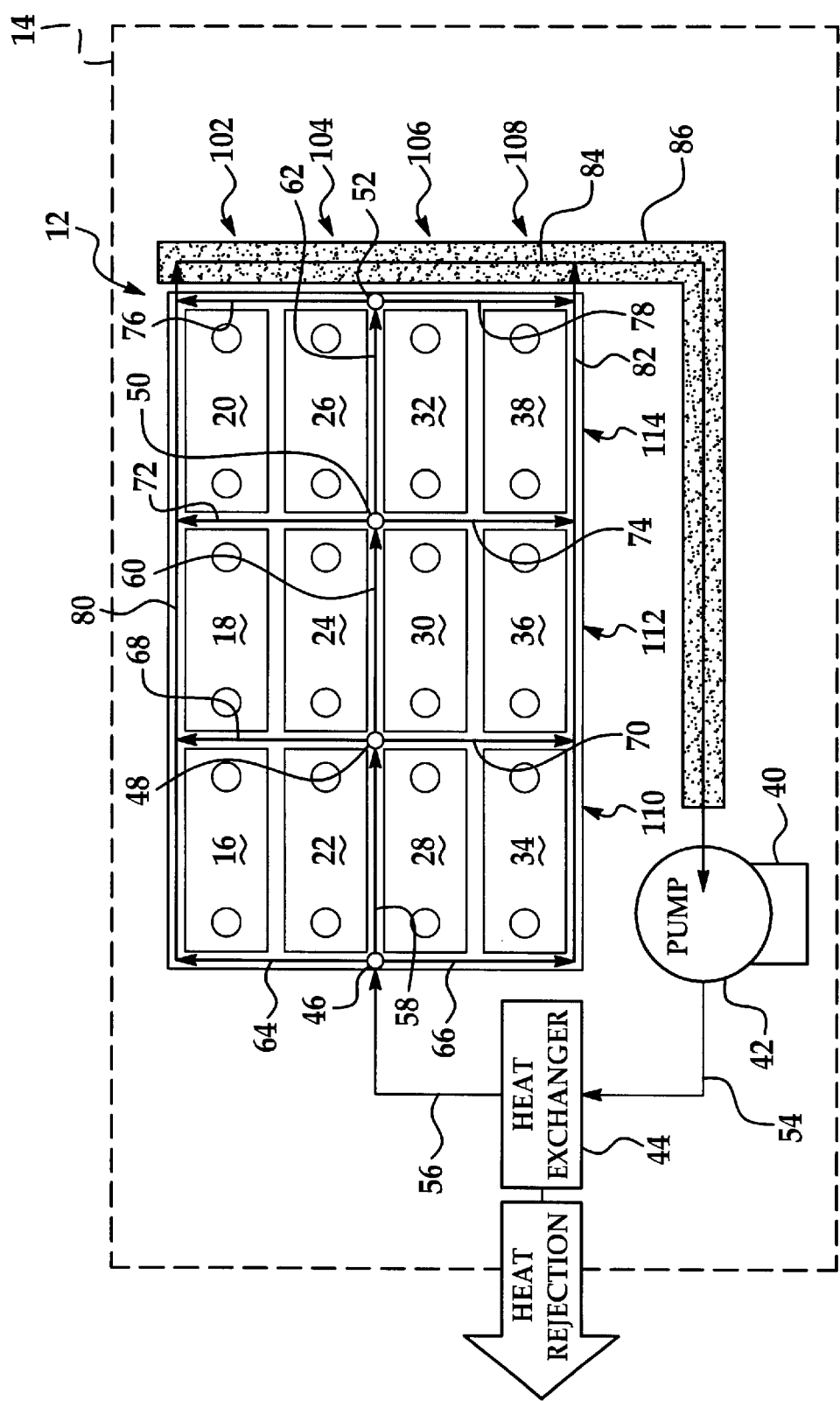
FIG. 1 is a schematic view of a system for cooling a battery pack which is made in accordance with the teachings of a preferred embodiment of the invention.

Referring now to FIG. 1, there is shown a system 10, which is made in accordance with the teachings of the preferred embodiment of the invention, and which is effective to cool a battery pack 12. System 10 is adapted for use in combination with a vehicle 14 including several batteries or battery modules 16–38 which provide power to the vehicle 12. In the preferred embodiment, vehicle 14 is an electric or hybrid-electric vehicle. While in the non-limiting embodiment shown in FIG. 1, battery pack 12 includes twelve (12) battery modules, it should be appreciated that in other embodiments, pack 12 may include any number of batteries and that system 10 can be accordingly modified to conform to the number of batteries within the battery pack 12. In the embodiment shown in FIG. 1 the batteries are arranged in four rows 102, 104, 106 and 108 and three columns 110, 112, and 114.

System 10 includes a refrigerant gas channeling or conduit system which is effective to store, compress, expand and circulate refrigerant gas through the battery pack 12 and the system 10. In the preferred embodiment, system 10 includes a refrigerant gas storage container, source or tank 40 which is operatively and fluidly coupled to a conventional pump and/or compressor 42, a conventional heat exchanger 44 (e.g., a conventional gas-to-air heat exchanger or gas-to-liquid heat exchanger) and several expansion valves 46, 48, 50 and 52. In the preferred embodiment, a conventional refrigerant gas is used within system 10, such a compressible, nonflammable fluorocarbon gas.

A first "high pressure" conduit system, having several tubes or conduits that are disposed throughout the vehicle 14, is used to selectively carry and transport pressurized or compressed refrigerant gas to the battery pack 12. Particularly, pump 42 is fluidly coupled to heat exchanger 44 by use of conduit 54; heat exchanger 44 is fluidly coupled to expansion valve 46 by use of conduit 56; expansion valve 46 is fluidly coupled to expansion valve 48 by use of conduit 58; expansion valve 48 is fluidly coupled to expansion valve 50 by use of conduit 60; and expansion valve 50 is fluidly coupled to expansion valve 52 by use of conduit 62. In the preferred embodiment, expansion valves 46, 48, 50 and 52, and conduits 58, 60 and 62 are disposed in the middle of battery pack 12, between rows 104, 106 (e.g., there are equal numbers of rows of batteries (two) on each side of valves 46–52 and conduits 58–62).

A second "low pressure" conduit system is used to circulate the "expanded" or decompressed refrigerant gas throughout the battery pack and to return the refrigerant gas to pump 42 for recompression. The low pressure conduit system includes several conduits which are in contact with one or more sides of the various battery modules 16–38 (e.g., with the casings or housings of the battery modules) and which absorb and/or dissipate heat from battery modules 16–38. Particularly, conduit 64 is fluidly coupled to expansion valve 46 and return conduit 80, and conduit 64 contacts and dissipates heat from battery modules 16, 22. Conduit 66 is fluidly coupled to expansion valve 46 and return conduit 82, and conduit 66 contacts and dissipates heat from battery modules 28, 34. Conduit 68 is fluidly coupled to expansion valve 48 and return conduits 80, and conduit 68 contacts and dissipates heat from battery modules 16, 22, 18 and 24. Conduit 70 is fluidly coupled to expansion valve 48 and return conduits 82, and conduit 70 contacts and dissipates heat from battery modules 28, 34, 30 and 36. Conduit 72 is fluidly coupled to expansion valve 50 and return conduit 80, and conduit 72 contacts and dissipates heat from battery modules 18, 24, 20 and 26. Conduit 74 is fluidly coupled to expansion valve 50 and return conduit 82, and conduit 74 contacts and dissipates heat from battery modules 30, 36, 32 and 38. Conduit 76 is fluidly coupled to expansion valve 52 and return conduit 80, and conduit 76 contacts and dissipates heat from battery modules 20 and 26. Conduit 78 is fluidly coupled to expansion valve 52 and return conduits 82, and conduit 78 contacts and dissipates heat from battery modules 32 and 38.

In the preferred embodiment, each "low-pressure" conduit 64, 66, 68, 70, 72, 74, 76, and 78 has a generally serpentine or otherwise convoluted shape in order to contact a relatively large portion of the surface area of the respective battery modules, thereby increasing heat dissipation from the battery modules. In other alternate embodiments, conduits 64–78 may have other shapes or configurations. In alternate embodiments, portions of the conduits 64–78 comprise passages which are integrally formed within the casings or housings of the respective battery modules. For example and without limitation, in one embodiment conduits 64–78 are fluidly coupled to cooling jackets which are located in pockets of the respective battery module casings.

Return conduit 84 is fluidly coupled to return conduits 80, 82 and to pump 42. Conduit 84 returns the expanded gas to pump 42 for recirculation within the system 10. In the preferred embodiment of the invention, conduit 84 is covered in an insulation coating 86. In one non-limiting embodiment, a heat exchanger is disposed within the return conduit 84.

It should be appreciated that the present invention is not limited to the foregoing conduit systems or configurations, and that in alternate embodiments, different and/or additional numbers of conduits may be used to interconnect the various components of system 10 and to transport and/or communicate refrigerant gas through the battery pack 12. For example and without limitation, system 10 may further include conduits which pass between rows 102, 104 and/or between rows 106, 108.

In operation, pump 42 compresses the refrigerant gas and communicates the compressed gas to the battery pack 12 through conduits 54, 56 and heat exchanger 44. When the gas traverses heat exchanger 44, thermal energy is removed from the gas, thereby cooling the gas. When the gas reaches expansion valve 46, it is expanded and partially diverted through conduits 64, 66, thereby cooling battery modules 16, 22, 28, and 34. The remaining compressed gas is channeled to expansion valve 48 which further expands another portion of the gas and partially diverts the expanded gas through conduits 68, 70, thereby cooling battery modules 16, 22, 28, 34, 18, 24, 30 and 36. The remaining compressed gas is channeled to expansion valve 50 which further expands another portion of the gas and partially diverts the expanded gas through conduits 72, 74, thereby cooling battery modules 18, 24, 30, 36, 20, 26, 32 and 38. The remaining compressed gas is channeled to expansion valve 52 which expands the remaining portion of the gas and diverts the expanded gas through conduits 76, 78, thereby cooling battery modules 20, 26, 32 and 38. The expanded gas relatively rapidly and evenly cools the battery modules 16–38 and is returned to the pump 42 by way of conduits 80, 82 and 84.

The pump 42 recompresses and recirculates the gas through the system. When the gas passes through heat exchanger 44, the thermal energy or heat stored within the gas is rejected into the atmosphere or into another cooling medium or heat sink.

In this manner, the battery cooling system 10 cools each of the battery modules 16–38 in a relatively rapid and even manner. By applying a substantially even rate of heat rejection throughout the battery pack 12, the battery cooling system 10 is able to substantially reduce thermal gradients throughout the pack, thereby allowing the battery pack 12 to perform at an optimal level.

It is to be understood that the invention is not to be limited to the exact construction and/or method which has been illustrated and discussed above, but that various changes and/or modifications may be made without departing from the spirit and the scope of the invention.

What is claimed is:

1. A system for cooling a battery pack of the type used within a vehicle, said system comprising:
    a source of refrigerant gas;
    a pump for compressing said refrigerant gas;
    a high pressure conduit system which is fluidly coupled to said pump and which delivers said compressed refrigerant gas to said battery pack;
    a plurality of expansion valves which are fluidly coupled to said high pressure conduit system and which is effective to decompress said refrigerant gas; and
    a low pressure conduit system which is fluidly coupled to said plurality of expansion values, which receives said decompressed refrigerant gas and circulates said refrigerant gas throughout said battery pack, thereby relatively rapidly and evenly cooling said battery pack.

2. The system of claim 1 wherein said low pressure conduit system is further fluidly coupled to said pump and is effective to return said circulated refrigerant gas to said pump.

3. The system of claim 1 wherein said battery pack comprises a plurality of battery modules, and wherein said low pressure conduit system includes a plurality of conduits which contact said plurality of battery modules.

4. The system of claim 3 wherein at least one of said plurality of conduits has a convoluted shape.

5. The system of claim 4 wherein said convoluted shape is serpentine.

6. The system of claim 3 wherein each of said plurality of battery modules comprises a casing and wherein a least a portion of said plurality of conduits are integrally formed within said casings.

7. The system of claim 1 wherein said plurality of expansion valves comprises four expansion valves.

8. The system of claim 1 further comprising a heat exchanger which is fluidly coupled to said pump and which is effective to remove thermal energy from said refrigerant gas.

9. The system of claim 8 wherein said heat exchanger is disposed within said high pressure conduit system.

10. The system of claim 8 wherein said heat exchanger is disposed within said low pressure conduit system.

11. A system for cooling a battery pack of the type used within a vehicle, said system comprising:

a source of refrigerant gas;

a pump for compressing said refrigerant gas;

a heat exchanger which is fluidly coupled to and receives compressed refrigerant gas from said pump;

a plurality of expansion valves which are fluidly coupled to and receive compressed refrigerant gas from said heat exchanger, said plurality of expansion valve being effective to selectively decompress said refrigerant gas;

a plurality of low-pressure conduits which are selectively disposed throughout said battery pack, said plurality of low-pressure conduits being fluidly coupled to said plurality of expansion valves, and being further effective to receive said decompressed refrigerant gas and circulate said refrigerant gas throughout said battery pack, thereby relatively rapidly and evenly cooling said battery pack; and wherein each of said plurality of expansion valves is coupled to a pair of low pressure conduits.

12. The system of claim 11 wherein said plurality of conduits are convoluted in shape.

13. The system of claim 11 wherein said plurality of conduits are serpentine in shape.

14. A method for cooling a battery pack of the type including a plurality of battery modules, said method comprising the steps of:

compressing refrigerant gas;

providing at least one high pressure conduit;

delivering said compressed refrigerant gas to said battery pack by use of at least one high pressure conduit;

decompressing said refrigerant gas; and channeling said decompressed refrigerant gas throughout said battery pack, thereby relatively rapidly and evenly cooling said plurality of battery modules.

15. The method of claim 14 further comprising the steps of:

forming a passages within said battery modules; and channeling said decompressed refrigerant gas through said passages, thereby relatively rapidly and evenly cooling said plurality of battery modules.

16. The method of claim 15 further comprising the steps of:

providing a plurality of conduits;

disposing said plurality of conduits between said plurality of battery modules within said battery pack; and channeling said decompressed refrigerant gas through said plurality of conduits, thereby relatively rapidly and evenly cooling said plurality of battery modules.

17. The method of claim 16 wherein said plurality of conduits are convoluted in shape.

18. The method of claim 16 wherein said plurality of conduits are serpentine in shape.

* * * * *